(No Model.)

P. WIEDERER.
HAND MIRROR.

No. 357,352. Patented Feb. 8, 1887.

WITNESSES:
H. N. Rosenbaum
Carl Kurz

INVENTOR
Peter Wiederer
BY Goepel & Raegener
ATTORNEYS

UNITED STATES PATENT OFFICE.

PETER WIEDERER, OF NEW YORK, N. Y.

HAND-MIRROR.

SPECIFICATION forming part of Letters Patent No. 357,352, dated February 8, 1887.

Application filed September 9, 1886. Serial No. 213,062. (No model.)

*To all whom it may concern:*

Be it known that I, PETER WIEDERER, of the city, county, and State of New York, have invented certain new and useful Improvements in Hand-Mirrors, of which the following is a specification.

This invention relates to a new and improved hand-mirror, held on a suitable back, and provided with a casing in which the mirror and back can be placed in different positions, so that either the back of the mirror or the glass will be in front of the casing.

The invention consists in the combination, with a mirror, of a backing on which it is held, and of a recessed flat case for receiving the mirror and its backing, said backing being connected by a suitable swivel-hinge with the case, so that the mirror and back can be held in different positions in the case—that is to say, so that the mirror is at the front of the case or the back of the mirror is at the front, as may be desired.

Figure 1:
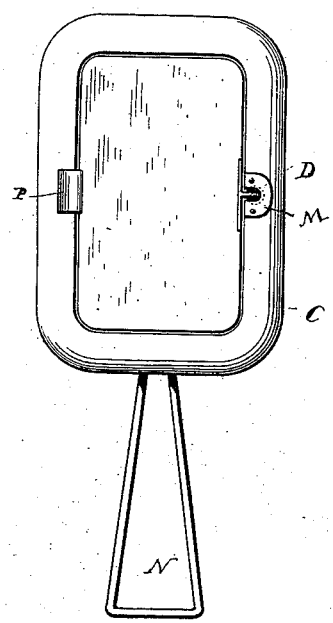
Figure 2:
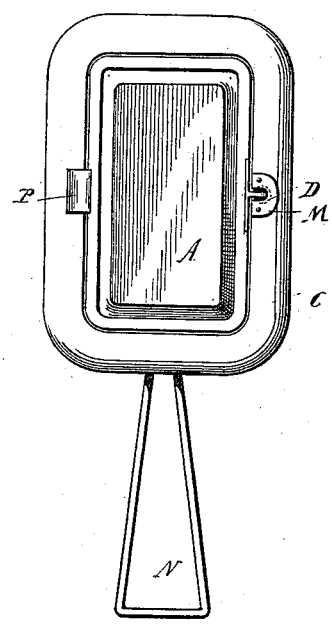
Figure 3:
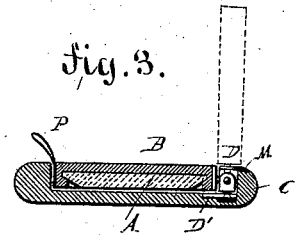
Figure 4:
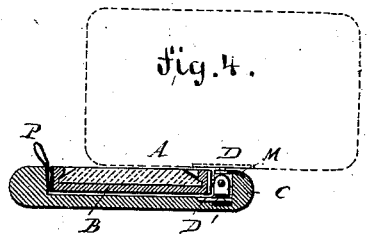
Figure 7:
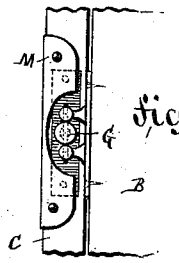
Figure 5:
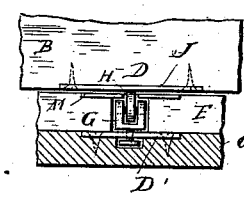
Figure 6:
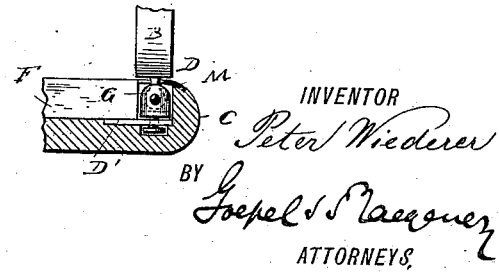

In the accompanying drawings, Figure 1 represents a front view of my improved mirror, showing the backing of the same on the outside. Fig. 2 is a face view of the same, showing the mirror on the outside. Fig. 3 is a cross-sectional view of Fig. 1; Fig. 4, a cross-sectional view of Fig. 2. Fig. 5 is a detail longitudinal view of the swivel-hinge. Fig. 6 is a side view of the same. Fig. 7 is a top view of a modified construction of the hinge.

Similar letters of reference indicate corresponding parts.

The mirror A, which may be square, oblong, elliptical, circular, or of any other desired shape, is held on a backing, B, in the usual manner. The flat case C is provided in one face with a recess, F, of the proper size and shape to receive the backing B and mirror A, held on the same. At one side or end edge of the backing B the same is connected by a swivel-hinge, D, with the case C, which swivel-hinge may be of any approved construction. As shown in Fig. 5, the said swivel-hinge consists of a plate, D', countersunk in the bottom of the recess F of the case C at one side edge, and on the said plate D' the forked post G is mounted to turn on its longitudinal axis, and between the prongs on said forked post G the eye H is pivoted by a suitable pin, which eye H is fastened on a plate, J, countersunk in the rim of the backing B of the mirror. The backing and mirror can thus be folded into the recess F, or swung out of the same, as shown in dotted lines in Fig. 3, and the post G can be turned on the plate D' on the longitudinal axis of said post, and with the said post the mirror turns. For example, when the mirror and backing are swung up in the position shown in dotted lines in Fig. 3, and the glass faces the recessed side of the case, the post G can be turned on its longitudinal axis one hundred and eighty degrees, or half a revolution, when the backing B will face the recess in the case C.

As shown in Fig. 3, the glass rests against the bottom of the recess F in the case C, and if the mirror is swung up in the position shown in dotted lines in Fig. 3, the post G is turned one hundred and eighty degrees, as stated above, and the mirror and backing then swung into the recess F, the backing will rest against the bottom of the recess, and the glass will be on the outside. The mirror can thus be reversed very easily to show the backing or glass on the outside, and in either position the backing and mirror can be folded into the recess F of the case C. As shown in Fig. 7, the post G may be provided with a ball-head, and the mirror with two balls at the sides of the ball-head on the post G, and a pin passed through the three balls.

To prevent the mirror swinging outward farther than into a position at right angles to the casing, as shown in dotted lines in Fig. 3, a notched plate, M, is secured on the outer surface of the raised rim of the casing, as shown in Figs. 1, 2, and 6. In the notch of said plate the eye H (shown in Fig. 5) or the two balls, Fig. 7, can pass. When the mirror is not in use, it is to be folded in the casing in such a manner that the backing is on the outside, and the glass of the mirror is fully protected.

When the mirror is to be used, all that is necessary is to swing it out of the recess of the casing until it is at right angles to the casing, and then turn it one hundred and eighty degrees and swing it back in the casing, when the glass will be on the outside.

The casing C is provided with any suitable handle or stand, N. The casing and mirror-back may be covered with any suitable material.

P is the handle-flap of the mirror and backing.

Having thus described my invention, I claim as new and desire to secure by Letters Patent—

1. The combination, with a mirror having a backing, of a recessed case for receiving the mirror and backing, and a swivel-hinge fastened at one edge to the mirror backing and casing, whereby the mirror can be placed in the recess of the casing, either with the glass side facing the bottom of the recess or with the outer surface of the backing facing the bottom of the recess, substantially as shown and described.

2. The combination, with a mirror having a backing, of a recessed case for receiving the mirror, a plate secured on the case, a hinge-post mounted to turn on its axis on said plate, and a hinge-piece fastened to the mirror-backing and pivoted to the post, substantially as shown and described.

3. The combination, with a mirror, of a backing, a recessed case for receiving the mirror and backing, a notched plate, M, on the edge of the case, a plate on the bottom of the recess of the casing, a post hinged to turn on said plate, and a hinge-piece pivoted to the post and fastened on the mirror-backing, substantially as set forth.

In testimony that I claim the foregoing as my invention I have signed my name in presence of two subscribing witnesses.

PETER WIEDERER.

Witnesses:
MARTIN PETRY,
CARL KARP.